June 26, 1945.   A. WARMISHAM   2,379,392
OPTICAL OBJECTIVE
Filed July 20, 1943
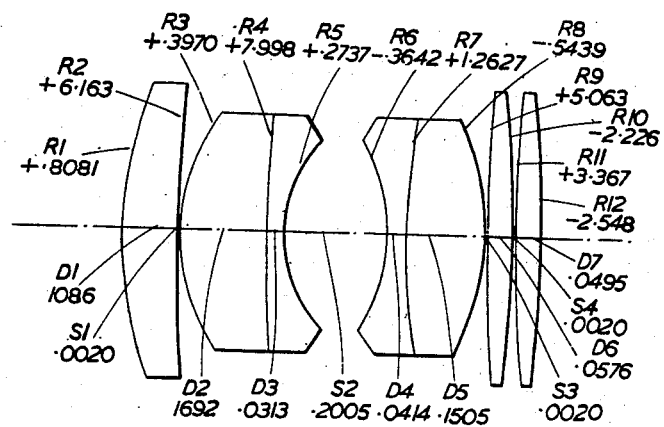
Inventor
A. Warmisham,
By
Attorneys Patented June 26, 1945

2,379,392

UNITED STATES PATENT OFFICE 2,379,392

OPTICAL OBJECTIVE

Arthur Warmisham, Leicester, England

Application July 20, 1943, Serial No. 495,437
In Great Britain March 29, 1943

7 Claims. (Cl. 88—57)

This invention relates to an optical objective for photographic or other purposes, corrected for spherical and chromatic aberrations, coma, astigmatism, field curvature and distortion, and of the kind comprising two compound dispersive meniscus components with their concave air-exposed surfaces facing one another disposed between a front collective component and a pair of rear collective components, the three collective components all being simple elements. It is to be understood that the term "front," as herein used, refers to the side of the objective nearer to the longer conjugate and the term "rear" to that nearer the shorter conjugate.

It is known in such an objective, in order to improve the corrections for spherical aberration and field curvature, to employ glasses having mean refractive index greater than 1.63 for the front element of the front compound dispersive component, for the rear element of the rear compound dispersive component and for the front member of the pair of rear collective components. In such known objective the two rear collective components have their shallower surfaces facing the front and the power of the collective rear component lies between 40% and 70% of the equivalent power of the whole objective.

The present invention has for its object still further to improve the correction of the aberrations of such objective, and to this end according to the invention the rear element of the rear compound dispersive component and the front member of the pair of rear collective components are each made of material having mean refractive index between 1.70 and 1.80 and Abbé $\nu$ number between 50 and 60. The same material is preferably used for both elements and conveniently they are both made of magnesium oxide crystal in the form known as $\beta$-magnesium oxide. As in the known objective it is preferable for the two collective rear components to have their shallower surfaces facing the front, and for the power of the rear component to lie between 40% and 70% of the equivalent power of the whole objective.

The radii of curvature of the rear surfaces of the two rear components are preferably both numerically less than 4.0 and greater than 1.5 times the equivalent focal length of the objective. The sum of the numerical values of the radii of curvature of the concave air exposed surfaces of the two compound dispersive components preferably lies between .5 and .7 times the equivalent focal length of the objective.

A preferred practical example of objective according to the invention is illustrated in the accompanying drawing, and numerical data for such example are given in the following table, in which $R_1$ $R_2$ . . . represent the radii of curvature of the individual surfaces counting from the front, the positive sign indicating that the surface is convex to the front and the negative sign that it is concave thereto, $D_1$ $D_2$ . . . represent the axial thicknesses of the individual elements, and $S_1$ $S_2$ . . . represent the axial air separations between the various components. The tables also give the mean refractive indices $n_D$ for the D-line and the Abbé $\nu$ numbers of the materials used for the elements.

| Equivalent focal length 1.000 | | Relative aperture F/1.5 | |
|---|---|---|---|
| Radius | Thickness or air separation | Refractive index $n_D$ | Abbé $\nu$ number |
| $R_1 +.8081$ | $D_1$ .1086 | 1.6135 | 53.5 |
| $R_2 +6.163$ | $S_1$ .0020 | | |
| $R_3 +.3970$ | $D_2$ .1692 | 1.6431 | 48.3 |
| $R_4 +7.998$ | $D_3$ .0313 | 1.67605 | 32.3 |
| $R_5 +.2737$ | $S_2$ .2005 | | |
| $R_6 -.3642$ | $D_4$ .0414 | 1.608 | 38.2 |
| $R_7 +1.2627$ | $D_5$ .1505 | 1.7385 | 53.5 |
| $R_8 -.5439$ | $S_3$ .0020 | | |
| $R_9 +5.063$ | $D_6$ .0576 | 1.7385 | 53.5 |
| $R_{10} -2.226$ | $S_4$ .0020 | | |
| $R_{11} +3.367$ | $D_7$ .0495 | 1.6135 | 59.3 |
| $R_{12} -2.548$ | | | |

In this example, the fourth component and the rear element of the third component are both made of magnesium oxide crystal. The front surfaces $R_9$ and $R_{11}$ of the two rear components are shallower than the rear surfaces $R_{10}$ and $R_{12}$ thereof, and such rear surfaces both have radii lying between 1.5 and 4.0 times the equivalent focal length of the objective. The power of the rear component is 42% of the equivalent power of the objective. The mean refractive index of the material used for the front element of the front compound dispersive component is greater than 1.63. The numerical sum of the radii $R_5$ and $R_6$ amounts to about .64 times the equivalent focal length. The back focal length of the objective is .5714 times the equivalent focal length.

What I claim as my invention and desire to secure by Letters Patent is:

1. An optical objective, corrected for spherical and chromatic abberrations, coma, astigmatism, field curvature and distortion, and comprising five components in axial alignment, of which the second and third are compound dispersive meniscus components disposed with their concave air-exposed surfaces facing one another, and the first, fourth and fifth are simple collective components, the fourth component and the rear element of the third component each being made of material having mean refractive index between 1.70 and 1.80 and Abbé $\nu$ number between 50 and 60, the power of the collective rear component lying between 40% and 70% of the equivalent power of the objective, the two collective rear components having their shallower surfaces facing the front.

2. An optical objective as claimed in claim 1 in which certain rear components are magnesium oxide crystals.

3. An optical objective, corrected for spherical and chromatic aberrations, coma, astigmatism, field curvature and distortion, and comprising five components in axial alignment, of which the second and third are compound dispersive meniscus components disposed with their concave air-exposed surfaces facing one another, and the first, fourth and fifth are simple collective components, the fourth component and the rear element of the third component each being made of material having mean refractive index between 1.70 and 1.80 and Abbé $\nu$ number between 50 and 60, the radius of curvature of the rear surface of each of the two rear collective components being numerically less than 4.0 and greater than 1.5 times the equivalent focal length of the objective, and numerically less than that of the front surface of the same component.

4. An optical objective, corrected for spherical and chromatic aberrations, coma, astigmatism, field curvature and distortion, and comprising five components in axial alignment, of which the second and third are compound dispersive meniscus components disposed with their concave air-exposed surfaces facing one another, and the first, fourth and fifth are simple collective components, the fourth component and the rear element of the third component each being made of material having mean refractive index between 1.70 and 1.80 and Abbé $\nu$ number between 50 and 60, the numerical sum of the radii of curvature of the concave air-exposed surfaces of the two compound dispersive components lying between .5 and .7 times the equivalent focal length of the objective, the two collective rear components having their shallower surfaces facing the front.

5. An optical objective, corrected for spherical and chromatic abberrations, coma, astigmatism, field curvature and distortion, and comprising five components in axial alignment, of which the second and third are compound dispersive meniscus components disposed with their concave air-exposed surfaces facing one another, and the first, fourth and fifth are simple collective components, the fourth component and the rear element of the third component each being made of material having mean refractive index between 1.70 and 1.80 and Abbé $\nu$ number between 50 and 60, in which the numerical sum of the radii of curvature of the concave air-exposed surfaces of the two compound dispersive components lies between .5 and .7 times the equivalent focal length of the objective, the power of the collective rear component lying between 40% and 70% of the equivalent power of the whole objective.

6. An optical objective, corrected for spherical and chromatic aberrations, coma, astigmatism, field curvature and distortion, and comprising five components in axial alignment, of which the second and third are compound dispersive meniscus components disposed with their concave air-exposed surfaces facing one another, and the first, fourth and fifth are simple collective components, the fourth component and the rear element of the third component each being made of material having mean refractive index between 1.70 and 1.80 and Abbé $\nu$ number between 50 and 60, and in which the numerical sum of the radii of curvature of the concave air-exposed surfaces of the two compound dispersive components lies between .5 and .7 times the equivalent focal length of the objective, whilst the radius of curvature of the rear surface of each of the two rear collective components is numerically less than 4.0 and greater than 1.5 times the equivalent focal length of the objective and numerically less than that of the front surface of the same component.

7. An optical objective having numerical data substantially as set forth in the following table:

| Equivalent focal length 1..00 | | Relative aperture F/1.5 | |
| --- | --- | --- | --- |
| Radius | Thickness or air separation | Refractive index $n_D$ | Abbé $\nu$ number |
| $R_1$+.8081 | $D_1$ .1086 | 1.6135 | 53.5 |
| $R_2$+6.163 | $S_1$ .0020 | | |
| $R_3$+.3970 | $D_2$ .1692 | 1.6431 | 48.3 |
| $R_4$+7.998 | $D_3$ .0313 | 1.67605 | 32.3 |
| $R_5$+.2737 | $S_2$ .2005 | | |
| $R_6$−.3642 | $D_4$ .0414 | 1.608 | 38.2 |
| $R_7$+1.2627 | $D_5$ .1505 | 1.7385 | 53.5 |
| $R_8$−.5439 | $S_3$ .0020 | | |
| $R_9$+5.063 | $D_6$ .0576 | 1.7385 | 53.5 |
| $R_{10}$−2.226 | $S_4$ .0020 | | |
| $R_{11}$+3.367 | $D_7$ .0495 | 1.6135 | 59.3 |
| $R_{12}$−2.548 | | | | in which $R_1$ $R_2$ . . . represent the radii of curvature of the individual surfaces counting from the front, the positive sign indicating that the surface is convex to the front and the negative sign that it is concave thereto, $D_1$ $D_2$ . . . represent the axial thicknesses of the individual elements, and $S_1$ $S_2$ . . . represent the axial air separations between the various components.

ARTHUR WARMISHAM.